(12) United States Patent
Voysey

(10) Patent No.: US 7,774,245 B2
(45) Date of Patent: Aug. 10, 2010

(54) BUILDING OPTIMIZATION PLATFORM AND WEB-BASED INVOICING SYSTEM

(75) Inventor: Keith Voysey, Yorba Linda, CA (US)

(73) Assignee: Genea Energy Partners, Inc., Yorba Linda, CA (US)

( * ) Notice: Subject to any disclaimer, the term of this patent is extended or adjusted under 35 U.S.C. 154(b) by 29 days.

(21) Appl. No.: 11/941,582

(22) Filed: Nov. 16, 2007

(65) Prior Publication Data

US 2008/0243657 A1    Oct. 2, 2008

Related U.S. Application Data

(60) Provisional application No. 60/859,802, filed on Nov. 16, 2006.

(51) Int. Cl.
  *G07F 19/00* (2006.01)
  *G05D 11/00* (2006.01)
  *G06F 15/02* (2006.01)
  *G01R 11/56* (2006.01)

(52) U.S. Cl. .................. 705/34; 700/291; 700/295; 705/9; 705/412

(58) Field of Classification Search ............ 700/291, 700/295
    See application file for complete search history.

(56) References Cited

U.S. PATENT DOCUMENTS 6,785,592 B1 *  8/2004  Smith et al. .............. 700/291
2005/0222889 A1 * 10/2005 Lai et al. ..................... 705/9
2005/0240315 A1 * 10/2005 Booth et al. ............. 700/295

* cited by examiner

*Primary Examiner*—F. Ryan Zeender
*Assistant Examiner*—Denisse Ortiz Roman
(74) *Attorney, Agent, or Firm*—Mintz, Levin, Cohn, Ferris, Glovsky & Popeo, P.C.

(57) ABSTRACT

A building management and optimization system and method are disclosed. Building services data obtained at the building is received by a building optimization platform through a first communication network. The building optimization platform includes at least one server system for generating an electronic invoice based on the building services use data. A representation of the electronic invoice is transmitted to a user interface through a second communication network for web-based review, editing and approval by a property manager associated with the building.

27 Claims, 18 Drawing Sheets

 Property Management Inc.

Statement

To:
1SOURCE, a Division of CG Schmidt, Inc.
875 East Wisconsin Avenue
Suite 625
Milwaukee, WI 53202

Attention: Accounts Payable

This Invoice is for metered services for meter: C G Schmidt Meter
C G Schmidt Meter KVVI ( K2, AJP.17)

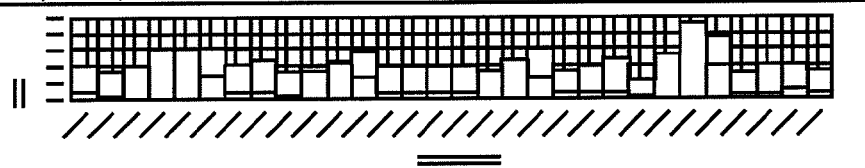

| Total Consumption | | | |
|---|---|---|---|
| | Reading | Date | |
| Final Reading: | 95,465.79 kWh | 9/30/05 23:59 | |
| Initial Reading: | 93,729.35 kWh | 9/01/05 00:00 | |
| Total Consumption: | 2,755.43 kWh | 30 Days | |

| Total Peak Consumption | | | Rate | Amount |
|---|---|---|---|---|
| On-Peak Consumption: | 1,177.31 kWh | | 0.058540 | $68.92 |
| On-Peak Consumption: | 1,579.12 kWh | | 0.033470 | $62.85 |
| On-Peak Demand Occured: | 9/22/05 09:00 | 15.77 kWh | 11.150000 | $175.81 |
| Customer Demand Occured: | 12/20/04 06:34 | 62:85 kWh | 0.700000 | $44.00 |

On-Peak From: 9 AM to 9 PM (Except Sat/Sun & Holidays)

| Service Fees: | Amount |
|---|---|
| For Meter Fee: | $29.00 |
| Monthly Flat Fee: | $9.75 |

|  |  |
|---|---|
| TOTAL UTILITY CHARGES: | $380.33 |

PLEASE MAKE CHECKS PAYABLE TO:
  Grand View Development Partners, LLC
  c/o Irgens Development Partners, LLC
  10201 Innovation Drive, Suite 600
  Milwaukee, WI 53226

THANK YOU!

FIG. 5A

# Property Management Inc.

Statement

To:
1SOURCE, a Division of CG Schmidt, Inc.
875 East Wisconsin Avenue
Suite 625
Milwaukee, WI 53202

Attention: Accounts Payable

This invoice is for after hours air conditioning

Statement Number: 000082
December 09, 2005

Billing Notes Legend

Tenant: Provident Investment Counsel PH
Building: Gateway Plaza

| DATE | USER | START | STOP | REQUEST HOURS | BILLING NOTES | BILLED HOURS | RATE | AMOUNT |
|---|---|---|---|---|---|---|---|---|
| 11/02/05 | Mike Khoe | 16:57 | 16:57 | 02:00 | 1 | 01.57 | 0.40 | 12.00 |
| 11/02/05 | Susan Parkes | 16:58 | 16:58 | 01:00 | 1,2 | 01.00 | 42.00 | 42.00 |
| 11/06/05 | Gary Thomas | 10:28 | 10:28 | 02:00 | | 03.00 | 42.00 | 126.00 |
| 11/07/05 | Susan Parkes | 16:57 | 16:57 | 01:00 | 1,2 | 01.00 | 42.00 | 42.00 |
| 11/08/05 | Anne Wedereich | 16:47 | 16:47 | 01:00 | 1,2 | 01.00 | 0.40 | 5.40 |
| 11/12/05 | Gary Thomas | 06:50 | 06:50 | 03:00 | 1,2 | 01.00 | 42.00 | 42.00 |
| 11/14/05 | Janet Whitley | 17:21 | 17:21 | 01:00 | | 01.00 | 42.00 | 5.40 |
| 11/17/05 | Janet Whitley | 16:55 | 16:55 | 01:00 | 1,2 | 01.00 | 0.40 | 5.40 |
| 11/21/05 | Janet Whitley | 16:55 | 16:55 | 01:00 | 1,2 | 01.00 | 0.40 | 5.40 |
| 11/22/05 | Susan Parkes | 00:45 | 00:45 | 01:00 | | 01.00 | 4.200 | 42.00 |
| 11/22/05 | Susan Parkes | 00:51 | 00:51 | 01:00 | 7 | 00.00 | 42.00 | 42.00 |
| 11/22/05 | Janet Whitley | 16:50 | 16:50 | 01:00 | 1,2 | 01.00 | 0.40 | 5.40 |
| 11/27/05 | Gary Thomas | 10:21 | 10:21 | 02:00 | | 02.00 | 42.00 | 55.72 |
| 11/28/05 | Anne Wedereich | 17:10 | 17:10 | 01:00 | | 01.00 | 0.40 | 5.40 |
| 11/29/05 | Standing Request [SRM-0002] | 17:00 | 17:00 | 01:00 | | 01.00 | 42.00 | 42.00 |

15 Requests    SUBTOTAL AMOUNT DUE    $523.00

PLEASE MAKE CHECKS PAYABLE TO:
Grand View Development Partners, LLC
c/o Irgens Development Partners, LLC
10201 Innovation Drive, Suite 600
Milwaukee, WI 53226

THANK YOU!

FIG. 5B

 Property Management Inc.

Statement

To:

eHarmony.com
300 North Lake

Pasadena, CA 91101

Attention: Accounts Payable

This invoice is for after hours air conditioning

Statement Number: 000080
December 09, 2005

Billing Notes Legend

Tenant: eHarmony (PIC) Suite 430
Building: Gateway Plaza

| DATE | USER | START | STOP | REQUEST HOURS | BILLING NOTES | BILLED HOURS | RATE | AMOUNT |
|---|---|---|---|---|---|---|---|---|
| 11/02/05 | Arman Awsdinian | 17:53 | 18:53 | 02:00 | 1 | 01.53 | 2.55 | 4.50 |
| 11/02/05 | Arman Awsdinian | 17:50 | 18:50 | 01:0 | 1,2 | 01.00 | 2.55 | 2.55 |
| 11/06/05 | Latter Tran | 17:58 | 20:00 | 03:00 | 1 | 02.56 | 38.92 | 114.57 |
| 11/07/05 | Latter Tran [SRN-7850] | 18:00 | 20:00 | 03:00 | 7 | 00.04 | 38.92 | 38.17 |
| 11/08/05 | Latter Tran [SRN-0708] | 18:00 | 21:00 | 03:00 | | 00.00 | 38.92 | 115.75 |
| 11/12/05 | Latter Tran [SRN-3478] | 18:00 | 21:00 | 03:00 | 7 | 00.00 | 38.92 | 0.00 |
| 11/14/05 | Latter Tran | 17:55 | 20:50 | 03:00 | 1 | 00.50 | 2.58 | 7.48 |
| 11/17/05 | Latter Tran [SRN-4148] | 18:00 | 21:00 | 03:00 | 7 | 00.04 | 38.92 | 38.92 |
| 8 | Requests | | | | SUBTOTAL AMOUNT DUE | | | $323.00 |

Tenant: eHarmony (PIC) Suite 1111
Building: Gateway Plaza

| DATE | USER | START | STOP | REQUEST HOURS | BILLING NOTES | BILLED HOURS | RATE | AMOUNT |
|---|---|---|---|---|---|---|---|---|
| 11/08/05 | Susan Parkes | 17:57 | 18:57 | 01:00 | 1,2 | 01.00 | 38.15 | 38.05 |
| 1 | Requests | | | | SUBTOTAL AMOUNT DUE | | | $38.05 |

Tenant: eHarmony (PIC) Suite 200-206
Building: Gateway Plaza

| DATE | USER | START | STOP | REQUEST HOURS | BILLING NOTES | BILLED HOURS | RATE | AMOUNT |
|---|---|---|---|---|---|---|---|---|
| 11/01/05 | Standing Request [SRN-8250] | 05:00 | 00:50 | 19:50 | 1 | 00.59 | 38.00 | 385.50 |
| 11/02/05 | Standing Request [SRN-7527] | 05:00 | 01:00 | 20:00 | 1 | 10.00 | 38.00 | 385.50 |
| 11/03/05 | Standing Request [SRN-7115] | 05:00 | 00:50 | 18:50 | 1 | 00.59 | 38.00 | 385.50 |
| 11/04/05 | Standing Request [SRN-5555] | 05:00 | 01:50 | 20:00 | 1 | 10.00 | 38.00 | 385.50 |
| 11/05/05 | Standing Request [SRN-7445] | 10:00 | 11:00 | 09:00 | 1 | 06.00 | 38.00 | 231.90 |

Page: 2

FIG. 5C

| Date | | Original Revenue | Revenue Adjustments | End Revenue |
|---|---|---|---|---|
| January | 2007 | $291,660.94 | $143,729.24 | $147,030.90 |
| February | 2007 | $319,447.85 | $-25,544.63 | $222,115.52 |
| March | 2007 | $395,642.91 | $-47,245.15 | $258,277.75 |
| April | 2007 | $345,855.20 | $425,502.15 | $257,253.05 |
| May | 2007 | $445,925.24 | $-156,528.40 | $202,645.05 |
| June | 2007 | $450,221.83 | $-114,247.65 | $345,034.12 |
| July | 2007 | $571,921.15 | $-129,141.27 | $302,183.35 |
| August | 2007 | $432,223.25 | $-162,004.47 | $420,157.29 |
| September | 2007 | $0.00 | $0.00 | $0.00 |
| October | 2007 | $0.00 | $0.00 | $0.00 |
| November | 2007 | $0.00 | $0.00 | $0.00 |
| December | 2007 | $0.00 | $0.00 | $0.00 |
| Year To Date | | $3,382,797.91 | $-1,027,927.00 | $2,304,570.65 |

BUILDING OPTIMIZATION PLATFORM AND WEB-BASED INVOICING SYSTEM

CROSS REFERENCE TO RELATED APPLICATION

The present patent application claims priority under 35 U.S.C. §119 to U.S. Provisional Patent Application Ser. No. 60/859,802, filed on Nov. 16, 2006, and entitled, "Afterhours Control System", the entire disclosure of which is incorporated by reference herein.

BACKGROUND

This disclosure relates generally to optimizing services for buildings, and more particularly to a system and method for automated management of energy-related building services.

Energy is the single highest expense incurred by property owners of buildings, and this expense is projected to grow dramatically over the next several years. According to a Nov. 25, 2005, Federal World Energy Study, energy costs are projected to double the rates used 15 years ago, exceeding $59.5 trillion annually. Off-peak electrical rates average $0.14/kWh and Peak rates can reach $2.40/kWh. When energy use is allowed to go unchecked, rolling blackouts can result. During peak hours, utility companies may even impose structured outages, known as "brownouts," and many energy companies are now proposing huge penalties for lack of controlled usage of building services such as energy services.

With the advent of digital controls to replace pneumatic controls for both new and existing buildings, several controls manufacturers have been digitizing the physical infrastructure of buildings. As energy demands and environmental concerns increase, states including California have instituted building efficiency standards (Title 24) to accelerate this digitization of building infrastructure in an effort to increase energy efficiency and reduce greenhouse gas emissions. In addition, tenants, building managers, and building owners are all proactively searching for solutions to address these concerns as they relate to buildings.

A common problem set faced by all building owners, managers or even tenants include lost revenue, wasted energy, operational inefficiencies, and lack of accountability. Historically, commercial tenants who have no limits or accountability imposed on them during operating hours waste the most energy. Further, there is significant consolidation occurring in ownership of buildings, yet building owners with large portfolios experience disparate energy management systems, property managers and building engineers.

SUMMARY

In general, this document discusses web-based systems and methods for managing and optimizing energy-related building services for buildings. These systems and methods can improve net operating income of a building, and therefore dramatically increase the underlying property value of the building, particularly for the building owner.

According to one aspect, a computer-implemented building management system includes a server system. The server system is adapted to receive building services data associated with one or more tenants through a first communication network, generate invoicing information for energy services use based on the building services data, and transmit the invoicing information in an electronic invoice that is accessible and approvable through a user interface connected to the server system via a second communication network.

According to another aspect, a computer-implemented building management method includes steps of receiving, through a first communication network, building services data obtained at the building, and generating an electronic invoice based on the building services use data. The method further includes a step of transmitting a representation of the electronic invoice to a user interface through a second communication network.

In accordance with yet another aspect, a computer-implemented building management method includes steps of providing an electronic invoice template to a server system, and generating, using the electronic invoice template, an electronic invoice for a tenant for energy services use based on energy services use data associated with the tenant obtained at the building. The method further includes a step of transmitting a representation of the electronic invoice to the tenant through a communication network.

In accordance with still yet another aspect, a computer-implemented method for managing services in a building includes a step of generating, for each of one or more tenants based on building services data obtained at the building, an electronic invoice having energy services use information and representing at least one invoice for energy services use associated with each of the one or more tenants. The method further includes steps of posting the electronic invoice for each of the one or more tenants to a web page associated with each of the one or more tenants, and storing the web page associated with each of the one or more tenants to a web server. The method further includes a step of transmitting, to a user interface associated with each of the one or more tenants through a communication network, a notification message notifying of the at least one invoice awaiting approval by each of the one or more tenants, the notification message containing a web link to the web page containing the electronic invoice. The method further includes steps of receiving a request via the web link for the web page from at least one of the one or more tenants through the communication network, and transmitting the electronic invoice to the user interface associated with at least one of the one or more tenants through the communication network, the electronic invoice further including a user-selectable approval function by which the at least one of the one or more tenants can approve the invoice via the electronic invoice.

The details of one or more embodiments are set forth in the accompanying drawings and the description below. Other features and advantages will be apparent from the description and drawings, and from the clams.

BRIEF DESCRIPTION OF THE DRAWINGS

These and other aspects will now be described in detail with reference to the following drawings.

FIGS. 5A-C show exemplary statements having detailed billing information for building services.

Like reference symbols in the various drawings indicate like elements.

DETAILED DESCRIPTION

This document describes a computer-implemented building optimization platform for buildings, such as multi-tenant office buildings. The platform utilizes automated, web and telephony-based building services management tools to control, account, and manage building services, to address lost revenue, wasted energy, operational inefficiencies, and previous lack of accountability for energy-related building services used by tenants.

The building optimization platform enables building owners and property managers to invoice tenants for above standard tenant services, i.e., any building service such as energy services that falls outside a normal tenant lease. Examples of above standard tenant services include, without limitation, a tenant's use of energy-related building services during non-lease hours or beyond agreed-upon levels—in other words, for energy services use that exceeds an amount, duration, or timeframe that are contractually covered by the tenant's existing lease. The building optimization platform can track consumption premised upon metered use values to allocate costs to tenants of a building.

The web-based approval process includes energy-related building services such as after hours HVAC, after hours lighting, tenant plug load usage, tenant equipment usage (such as HVAC equipment for cooling tenant-specific areas or equipment), and for tenants that pay for their own utilities, accelerated depreciation of mechanical equipment. The building optimization platform tracks and invoices for the following: source of after hours request, time of after hours request (billable or nonbillable event), type of after hours request (lighting only, or both lighting and HVAC), duration of request, billing rates (consolidated, split, flat, tiered, and/or metered), aggregate value of invoices currently unbilled, and/or common points concurrently used that may provide split billing.

The building optimization platform works in several key ways to address lost revenue, wasted energy, operational inefficiencies, and lack of accountability that afflicts most office buildings. The building optimization platform communicates with the building at a physical infrastructure level by overlaying onto the building's existing energy management system (EMS) and hardware. The building optimization platform also automates many of the complicated and manual building management processes used by owners, property managers, accountants, building engineers, and tenants, and integrates into the building owner's or property manager's accounting or ERP system. The building optimization platform further provides on-demand capability for tenants via a web browser, phone, or PDA that allows them to request, schedule, and manage their own energy-related building services.

Figure 1:
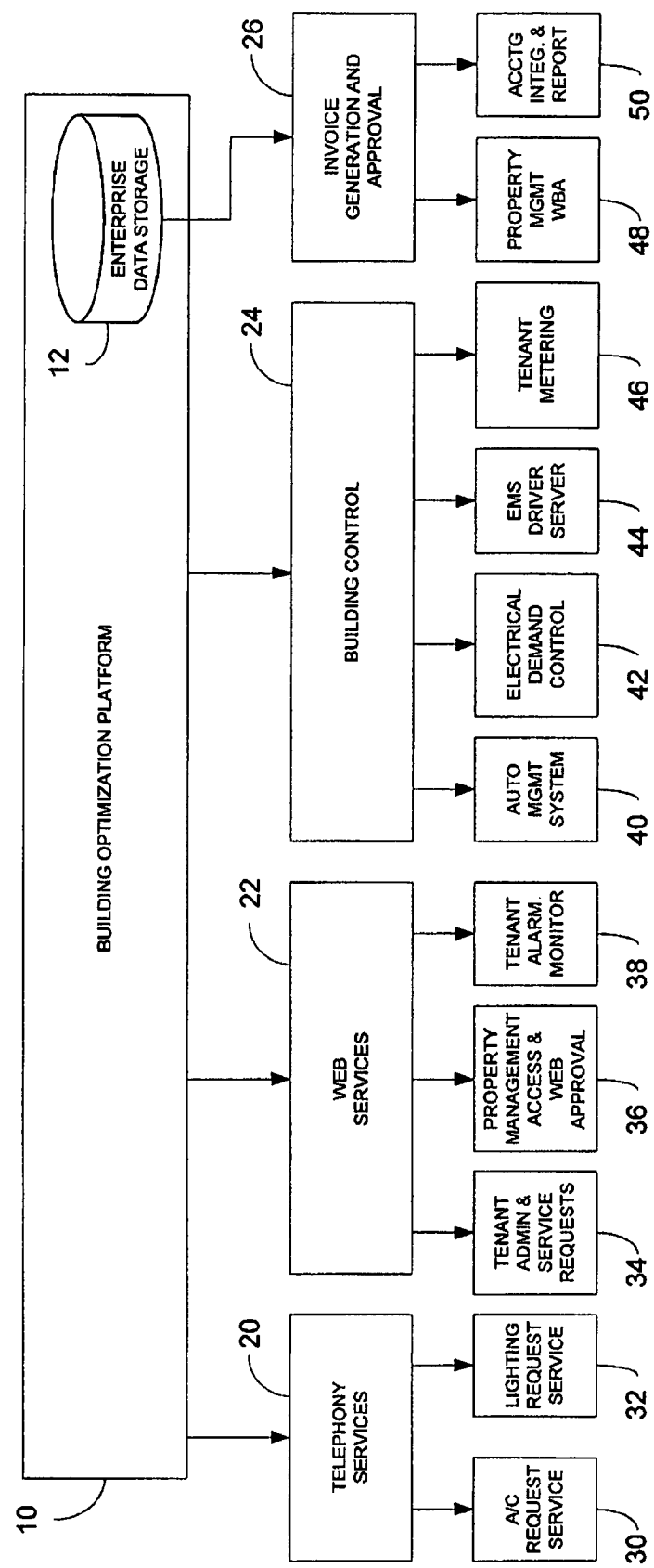
FIG. 1 is a functional block diagram of a building optimization platform.

FIG. 1 is a functional block diagram of a building optimization platform 10 for managing business processes, implemented and executed as a set of services, to optimize building services for buildings. The building optimization platform 10 includes an enterprise data storage 12, business processes of telephony services 20, web services 22, building control services 24, and accounting and invoice generation services 26.

The telephony services 20 are managed and controlled by a telephony server, and include A/C request services 30 and lighting request services 32, which together with other control functions of the building optimization platform 10 enables remote tenant access (via phone and/or internet) which allows tenants to use after hours (i.e. hours within a day or on weekends that are not covered by a tenant lease or other contractual obligation to the tenant) air conditioning and lighting for a fee, and provides property owners/managers with automated tracking and billing.

The A/C request services 30 and lighting request services 32 include telephony interface with a server that is part of the building optimization platform 10, which enables any tenant to request above-standard energy-related building services via commands input into a telephone. The requests are automatically captured by the server and provided to accounting and invoice generation services 26, as will be described in further detail below. Accordingly, the combination of telephony services and invoice generation and web approval services enables tenants, property managers and system administrators to accurately monitor, track, invoice and monetize above standard services provided to requesting tenants.

The web services 22 enable web-based access to and management of after hours services and automated billing using an application service provider (ASP) modeled server system. Web services 22 include tenant administration and service requests 34, and tenant alarm monitoring 38. Web services 22 also implements an automated process of tenant metering and to provide a web-based management approval process 36 for invoices, services, etc.

Building control services 24 are hosted in a server system and controlled by building optimization platform 10 based on input executed through web services 22 and telephony services 20. Building control services 24 includes an Energy Management System (EMS) driver server 44 that includes interface software for interacting and controlling a number of different EMS control systems made by various EMS manufacturers and open protocols, such as BACNET, Lonworks, Modbus, etc. The EMS driver server 44 is preferably implemented utilizing remote procedure call (RPC) enabled building connectivity. Building control services 24 also includes an automated management system (AMS) 40, a server and web-based SaaS-modeled control system that utilizes advanced energy services control algorithms to constantly monitor and adjust a building's HVAC system to achieve the lowest possible energy consumption, and system administration and property management 46.

Building control services 24 also implements Electrical Demand Control 42 for Peak Demand Limiting/Demand Response. Peak Demand Limiting provides constant monitoring of the building's electric load for the highest periodic power consumption to confine and limit demand, which results in lower utility bills, utility rebates and incentives to transfer to a more preferred rate schedule, and also reduces the ratcheting effect of annual peak charges. Tenant Metering 46 provides reading, tracking and billing services for advanced tenant billing for above standard tenant services. Consumption outside lease hours, over allotted lease allowance, peak charges, and maximum peak as well as supplemental equipment metering are tracked and invoiced by building control services 24.

Account and invoice generation services 26 includes property management web based approval process 48 and accounting integration and reporting 50, which are explained further below.

Figure 2:
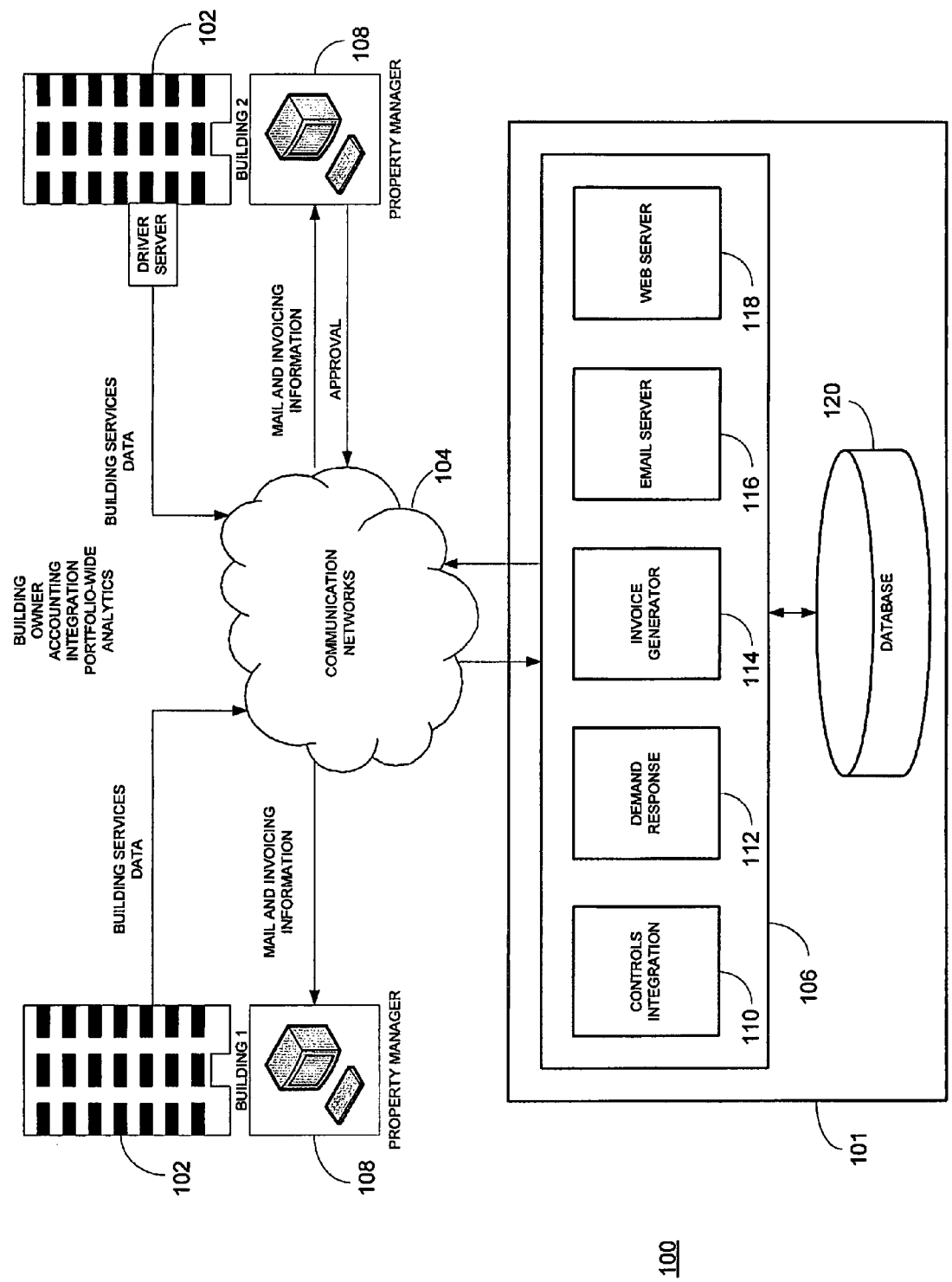
FIG. 2 illustrates a building services management system.

FIG. 2 illustrates a building management system 100 that includes a building optimization platform 101 for managing, controlling, and optimizing building services via business processes implemented as a set of services. The building optimization platform 101 includes a first communication interface that is adapted to receive building services data from one or more buildings 102 via a first communication network 104. The building optimization platform 101 further includes a server system 106 that generates invoicing information for building services used at the buildings 102 based on the building services data, and transmits the invoicing information in an electronic invoice through a second communication interface. The invoicing information is accessible and approvable through a user interface of a client computer 108 connected to the server system 106 via a second communication network 104.

The building services data is preferably generated by one or more energy management systems (EMSs) located throughout each building 102. Each EMS includes digital sensor and control hardware and software that is built and installed by any number of third party vendors. The EMSs monitor building services use or consumption, such as lighting and A/C systems, at various locations within the building 102, and communicate the use data via the first communications network 104, which can include one or more wireless communication networks, and operating according to one or more open protocols, such as BACNET, Lonworks, Modbus, etc.

The building management system 100 can include a driver server 103 that can be used to connect to a network of EMSs within a building. Server system 106 preferably communicates using XML—driver server 103 translates XML data into serial data used by EMS Can reside on a separate PC, a workstation, or need not be used at all. Allows connectivity, if necessary, to an EMS depending on the EMS type. Hosts one or more drivers for each EMS used in the building.

The building services data is received and processed by a controls integration module 110 in the server system. A demand response module 1112, as part of an automated management system at the server system 106, monitors the building services data and can control building services, such as fulfilling after hours lighting requests, limit energy consumption during peak demand periods, etc.

The server system 106 includes an invoice generator 114 that generates an electronic invoice for each tenant of each building 102. The electronic invoice includes invoice template information and tenant information that is stored for each tenant in a database 120. The tenant information can be entered into the database manually, during a setup process. The electronic invoice is generated regularly, preferably on a periodic basis such as monthly. The electronic invoice represents an invoice for "above standard tenant services"—any service that falls outside a normal lease for the tenant.

Once the electronic invoice is generated, it is posted to web server 118. An electronic message is then generated by email server 116 and sent to the client computer 108, which is typically used by a property manager associated with at least one building 102. The electronic message contains a notification of the availability of the electronic invoice, as well as a hypertext link to the electronic invoice stored either in the database 120 or on web server 118. Once a user of the client computer 108 selects the relevant link, the web server 118 transmits a log-on page in which the property manager can gain access to a building services website in which the property manager can manage all energy-related tenant services.

The building services website includes one or more web pages containing the electronic invoice that can be displayed in a user interface of the client computer 108, such as a browser application used by the client computer 108. The electronic invoice can be generated in HTML or XML, and delivered through communication network 104 by any one of a number of communication protocols, including HTTP.

The email server 116 can also be configured to generate and send confirmation emails to tenant for services they request. For example, if a tenant requests 500 hours of after-hours lighting services, the email server 116 generates an email which automatically is sent to the tenant, tenant office manager, property manager and/or system administrator to confirm requesting tenant, the type of services requested, duration, and date, among other possible information. The email server is linked with and provides the invoice generator 114 with the request information for invoice generation.

Acknowledgements of the confirmation emails are processed by the demand response module 114 of the server system 106, or other control server. Changes to requests, later declines of a requests, or any other changes can be executed by the tenant or responsible party clicking on a link in the confirmation email to reach the demand response module 114 of the server system 106 of the building optimization platform 101.

Figure 3:
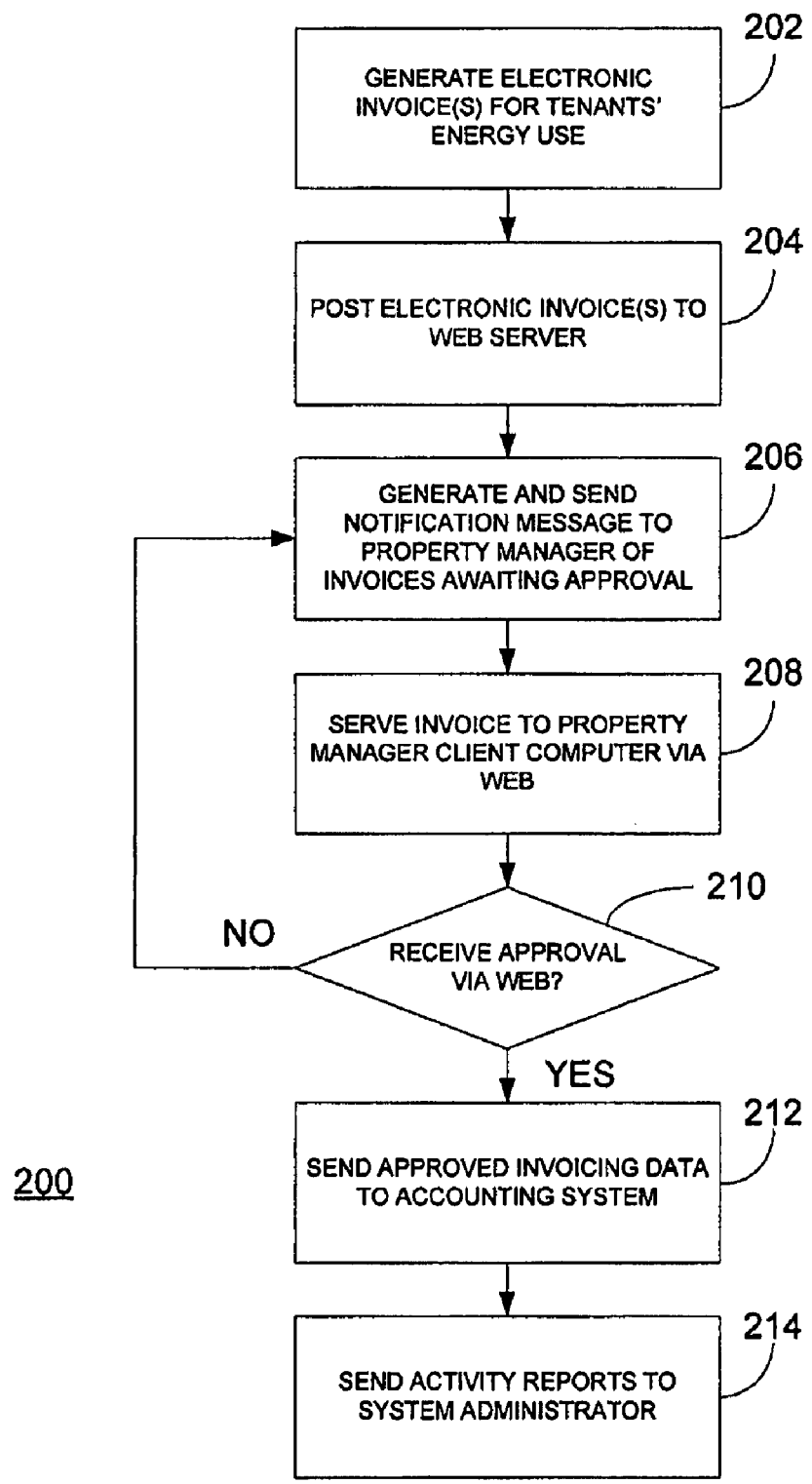
FIG. 3 is a flowchart that illustrates a web-based invoice approval process for energy-related building services.

FIG. 3 illustrates a method 200 for managing building services in a building, in accordance with a web-based invoice generation, transmission and approval process. At 202, an electronic invoice is generated. The electronic invoice includes invoicing information relating to energy services usage by each of a number of tenants. The electronic invoice can be generated from a computer-implemented template that is populated with tenant data entered by a system administrator or property manager, as well as building services data obtained at the building via EMSs connected to a building optimization platform via a first communication channel. At 204, the electronic invoice is posted to a web page in a web server.

At 206, a notification message is generated and sent to a client computer associated with a property manager, for display on a user interface of the client computer. The notification message includes a notification of all current invoices that need property manager approval, and include a link or other representation of the electronic invoice for accessing the electronic invoice from the web server. If a user selects or clicks on the link, at 208 the electronic invoice is served to the client computer via the web or similar communication network. The electronic invoice includes a user-selectable approval function such as a button or link, by which the property manager can approve the invoice. Otherwise, the electronic invoice provides interactive fields for proposing an adjustment of any aspect of the electronic invoice.

At 210 the property manager can provide approval of the invoice via the web. If the property manager does not approve the invoice, the electronic invoice is stored in the web server and re-sent after a predetermined period of time, such as 10 days. If the property manager does send approval of the invoice via the web, the approved invoicing information is sent to the building owner's accounting system at 212. At 214, activity reports regarding invoicing activity are sent to the system administrator, to prevent duplicative billing and/or errors in the invoicing process.

The setup for the system can take place in a tenant manager window of a web-delivered application resident on the tenant manager's workstation, referred to as client computer 108. The application can be locally stored and executed, or remotely stored delivered from a server and then locally executed. The system allows a property manager to configure advance system settings, and create custom HVAC, plug outlet, and lighting point groups or zones within the building, in a granularity even greater than simply by floor of the building. The system further allows the property manager to create a consolidated billing list for invoice recipients, create customized reports according to portfolio of buildings for the building owner, according to building type, sorted by property manager, or by building. The system also allows the property manager to enable system security.

FIGS. 4A-H show various exemplary property management web pages of a website as part of a building optimization platform. In preferred implementations, the property management web pages are designed to perform two primary functions. First, through a Tenants link, property managers can perform tenant maintenance tasks, such as scheduling immediate, future and reoccurring service, cancel service and assign access rights to any tenant within their buildings. Second, at the beginning of each month, property managers review, adjust and approve the previous months billings before a data file containing the invoices are transmitted directly to accounting personnel.

The following describes a specific implementation of a web-based approval system executed by a building optimization platform, as a reference to FIGS. 4A-H:

1. At 1:00 AM on the second of each month the building optimization platform automatically generates all after hours billings and posts them directly to a website. The system will also send out an email to each property manager explaining that they have ten days to review and approve "X" amount of invoices.

2. During this ten day period, the property manager at any time can review, edit and approve after hours invoices, described in further detail below and with reference to FIGS. 4A-H. Also available to the property manager is the ability to print invoices as well as after hours income variance reports. These reports are available only as reference data only, this is due to all billing being performed automatically in a later procedure.

3. If necessary, twenty-four hours before the end of the ten day period, a second email reminder is sent explaining that there are still "X" of "Y" invoices that need approval.

4. At the end of the ten day period, all non reviewed/approved invoices are automatically marked as "approved" and will be invoiced accordingly.

5. On the tenth day of each month the building optimization platform automatically emails to accounting personnel a data file as well as a PDF file of traditional invoices containing all after hours billing information. The data file can be used to import all after hours information directly into the appropriate accounting system.

Figure 4A:
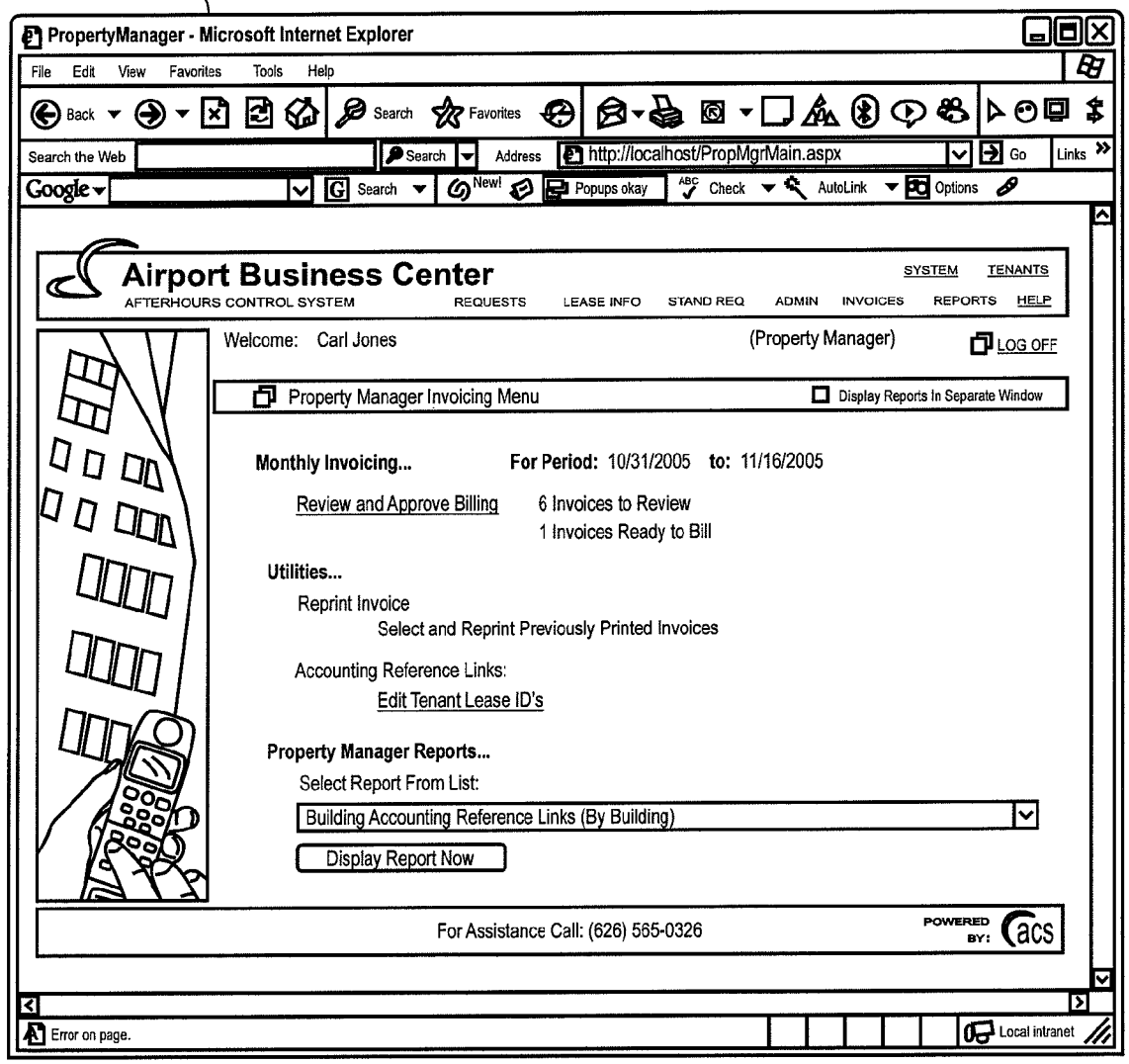
FIGS. 4A-H are exemplary screenshots of a graphical user interface to illustrate an implementation of web approval process of invoices for above standard services.

Referring now to the figures, FIG. 4A is a screenshot of an exemplary property management page 402 that can be accessed by a property manager. There property management page 402 provides a number of functions for a property manager, including functions to: approve the previous months invoices, reprint past invoices, update or set tenant lease ID numbers, and print system reports. The property management page 402 also enables functions to select a tenant for after hours setup functions, and review system activity.

Figure 4B:
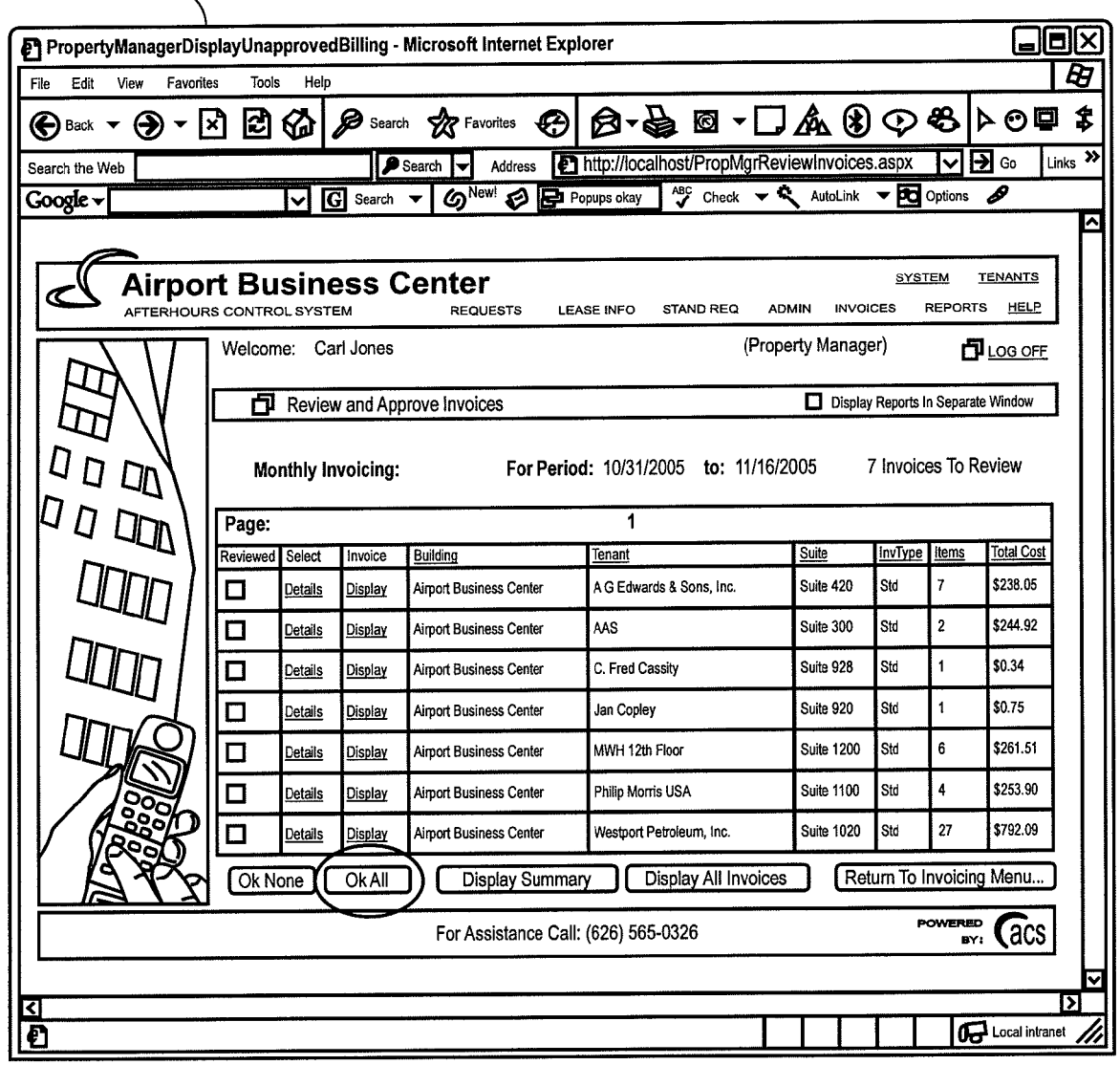

For monthly invoicing functions, from the property management page 402 a user can select a "Review and Approve Billing" link or similar link, which causes a monthly invoicing approval screen 404 to appear, such as is exemplified and shown in FIG. 4B. The monthly invoicing approval screen 404 can be configured to enables billing approvals for a current billing period only. In some particular exemplary implementations, the monthly invoicing approval screen 404 is operated in the following manner:

To approve all billing without any editing, an [OK All] button is selected, or once verified, each line item as approved is checked. To undo all previous approved billings, an [OK None] button is selected. To modify a tenants invoice, the Details link can be clicked on. To display a tenants invoice, the Display link can be clicked on. To display all invoices, a [Display All Invoices] button can be clicked on. And, to display the invoice summary report, a [Display Summary] link or button is clicked on.

Figure 4C:
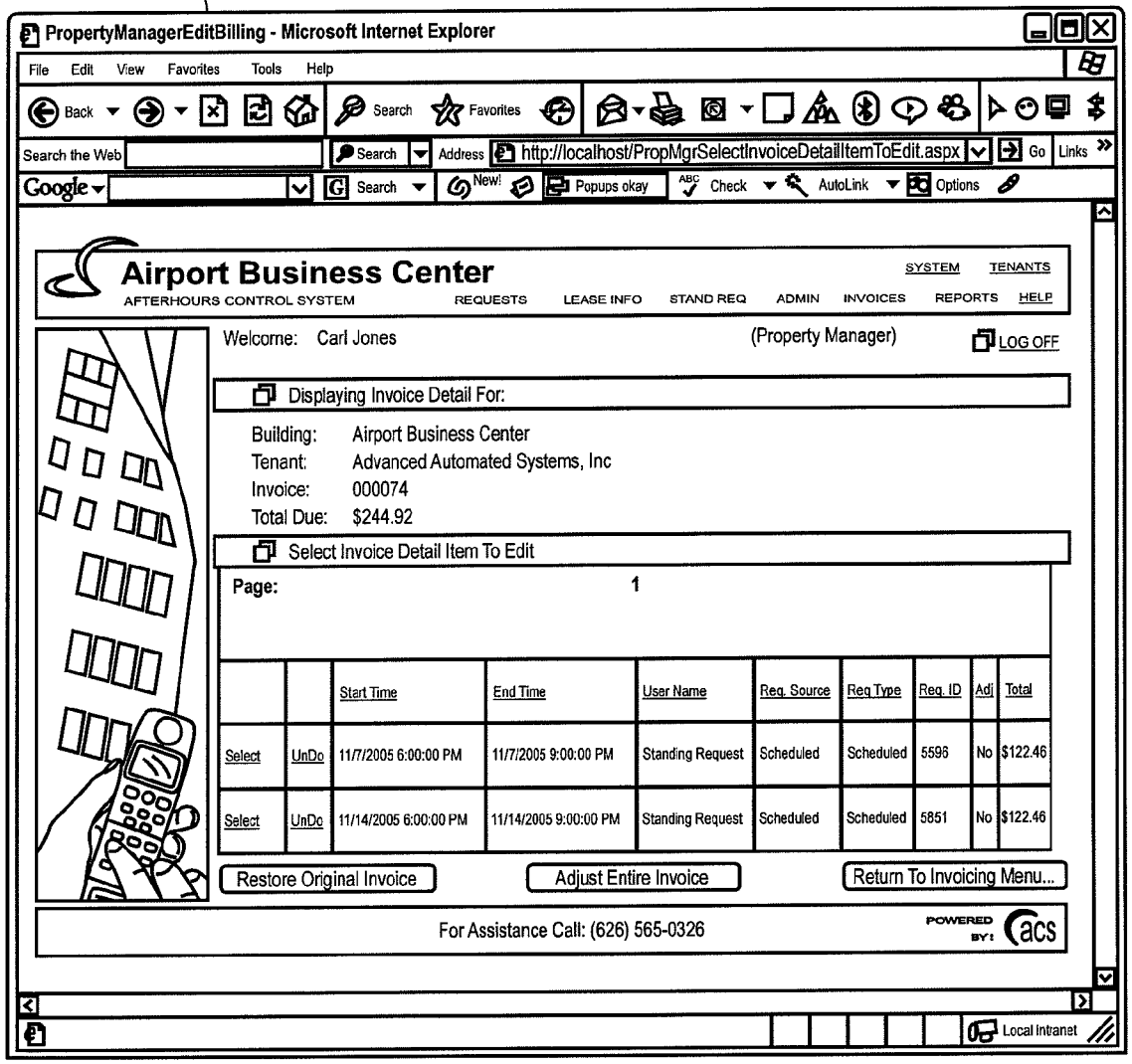

To view a tenants invoice detail, a [Details] link or button can be clicked on, to navigate from the monthly invoicing approval screen 404 to an invoice detail page 406 as shown in FIG. 4C. The invoice detail page 406 allows a user to adjust all invoice items by clicking on an [Adjust Entire Invoice] button. For individual line item editing, each line item can be selected by clicking on an associated link or button. This provides a property manager the control to view and edit tenant invoices in highly granular detail.

Figure 4D:
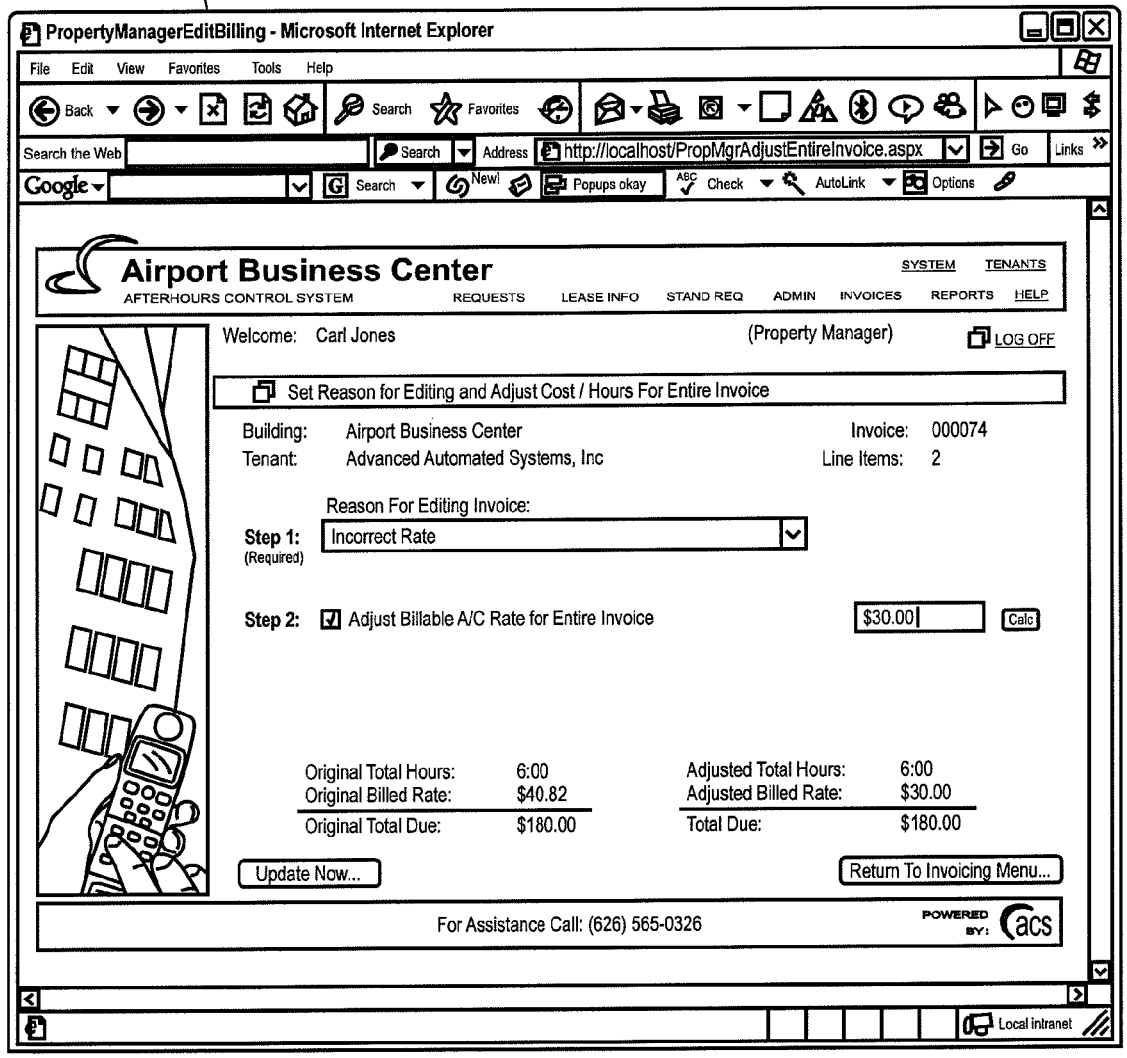

FIG. 4D shows an exemplary screenshot of an adjust entire invoice page 408, in which the user can adjust all invoice items. In some implementations, a reason for adjusting any aspect of an invoice must be provided before the user is allowed to continue. To provide the reason, the user fills out the appropriate fields—this changes depending on reason—and then selects an [Update Now] button to save changes, or clicks on an [Return to Invoice Menu] button or link to exit without saving changes. In some implementations, a [Calc] button recalculates the invoice based on the new parameters. Further, once any item has been modified, the system usage lines on a parent page, i.e. in FIGS. 4A-C, can include an indicator, such as a text or background color, to indicate the invoice has been edited. For example, system usage lines can be colored yellow to indicate edits.

Figure 4E:
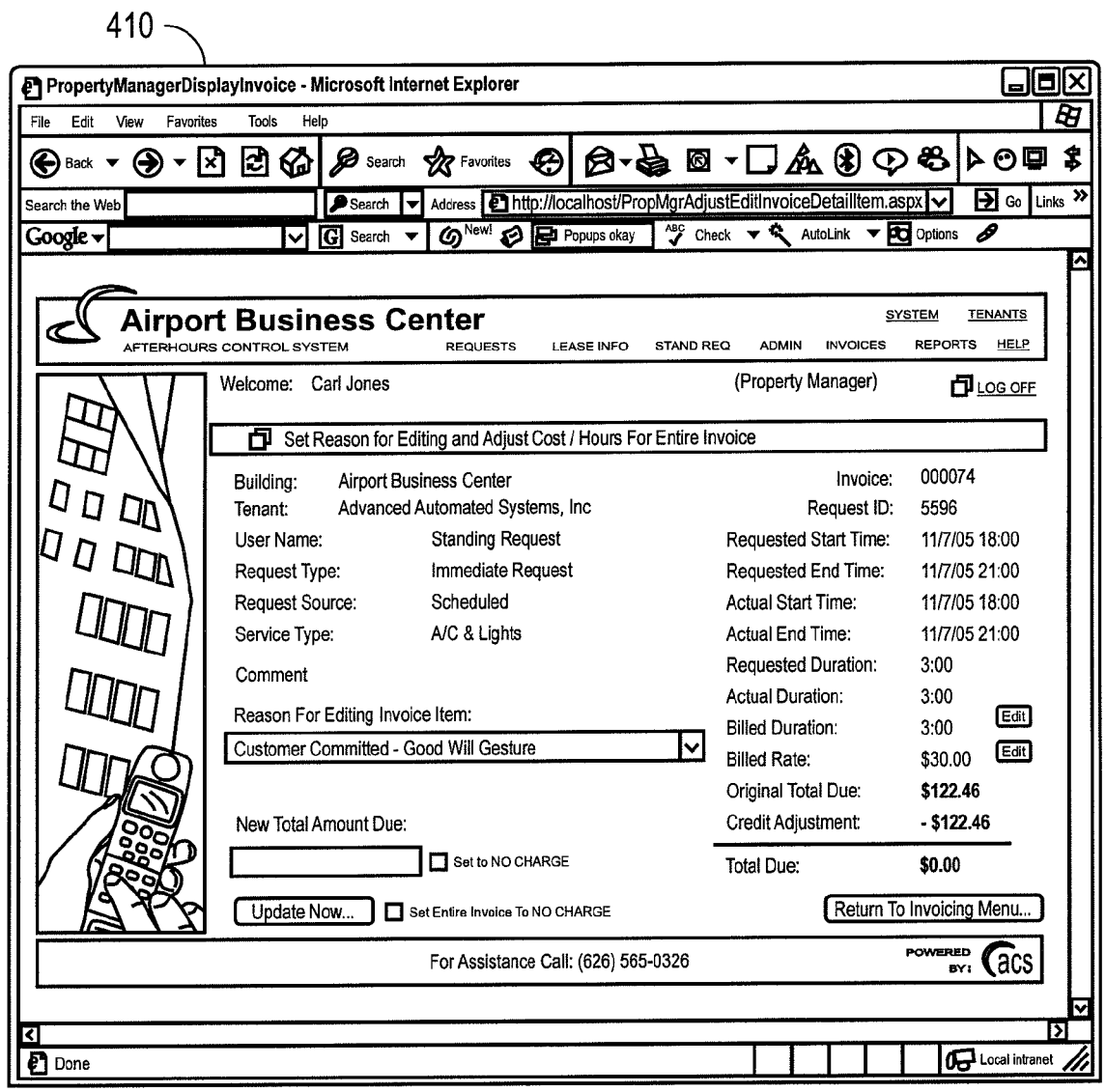

FIG. 4E shows an exemplary screenshot of an adjust line item page 410 in which the user can make adjustments on a line item basis. A reason must be selected before continuing. Once the user fills out the appropriate fields, an [Update Now] button can be clicked to save changes, or a [Return to Invoice Menu] button can be clicked to exit without saving the changes. In some implementations, a [Calc] and/or an [Edit] button recalculates the invoice based on the new parameters. As with the adjust entire invoice page 408, once any item has been modified on the adjust line item page 410, the system usage lines on a parent page can include an indicator, such as a text or background color, to indicate the invoice has been edited.

Figure 4F:
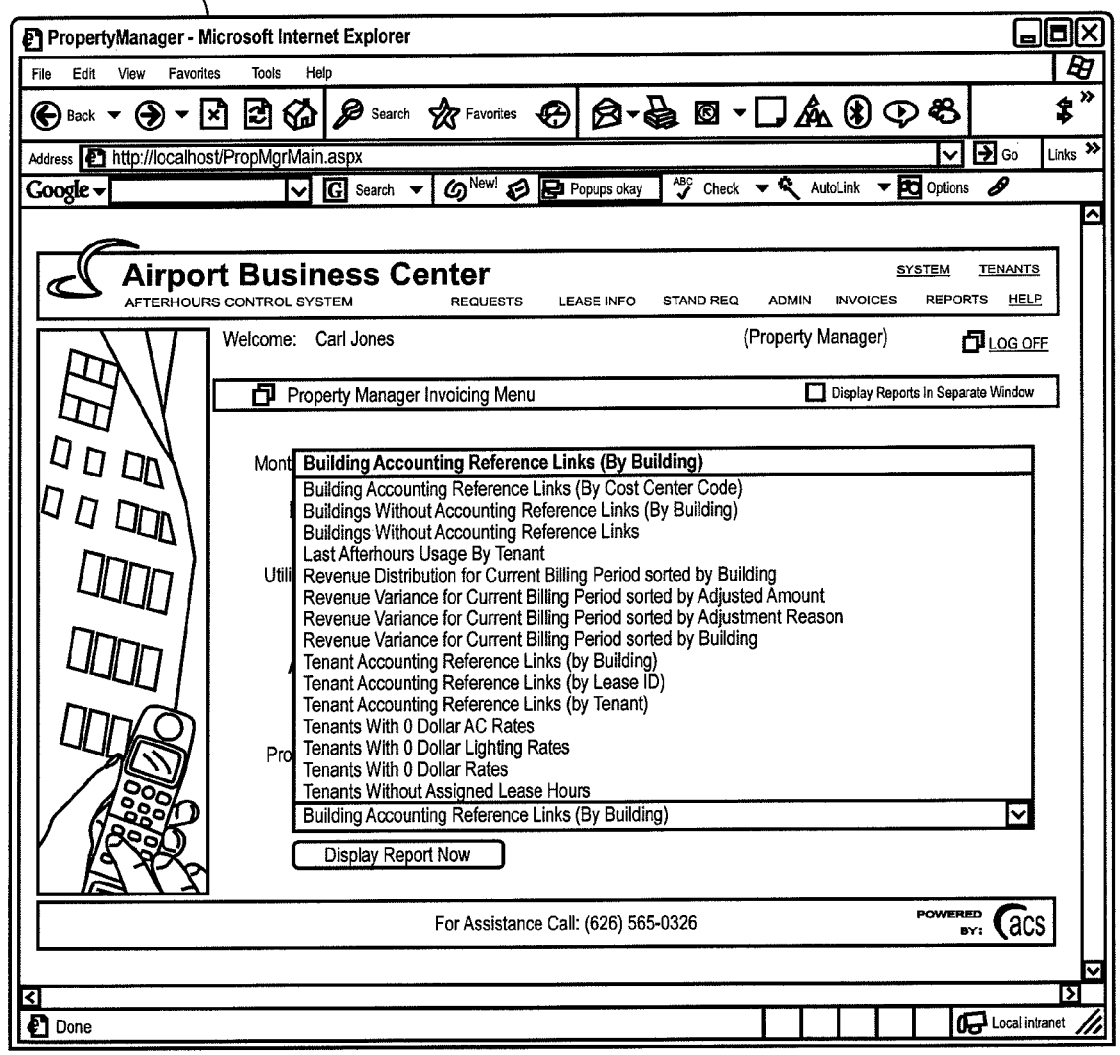

FIG. 4F shows an exemplary screenshot of a property management reports page 412, having a list box of possible reports from which a user can select for any type of analytics or further processing. In preferred implementations, the user selects the desired report, then clicks on the [Display Report Now] button. The report is then displayed, using data file viewer loaded on the local client computer. In some implementations, an Adobe Postscript Datafile (PDF) format is used. Reports can be displayed in a separate window by clicking on a [Display Reports in Separate Window] check Box located on the title bar.

Figure 4G:
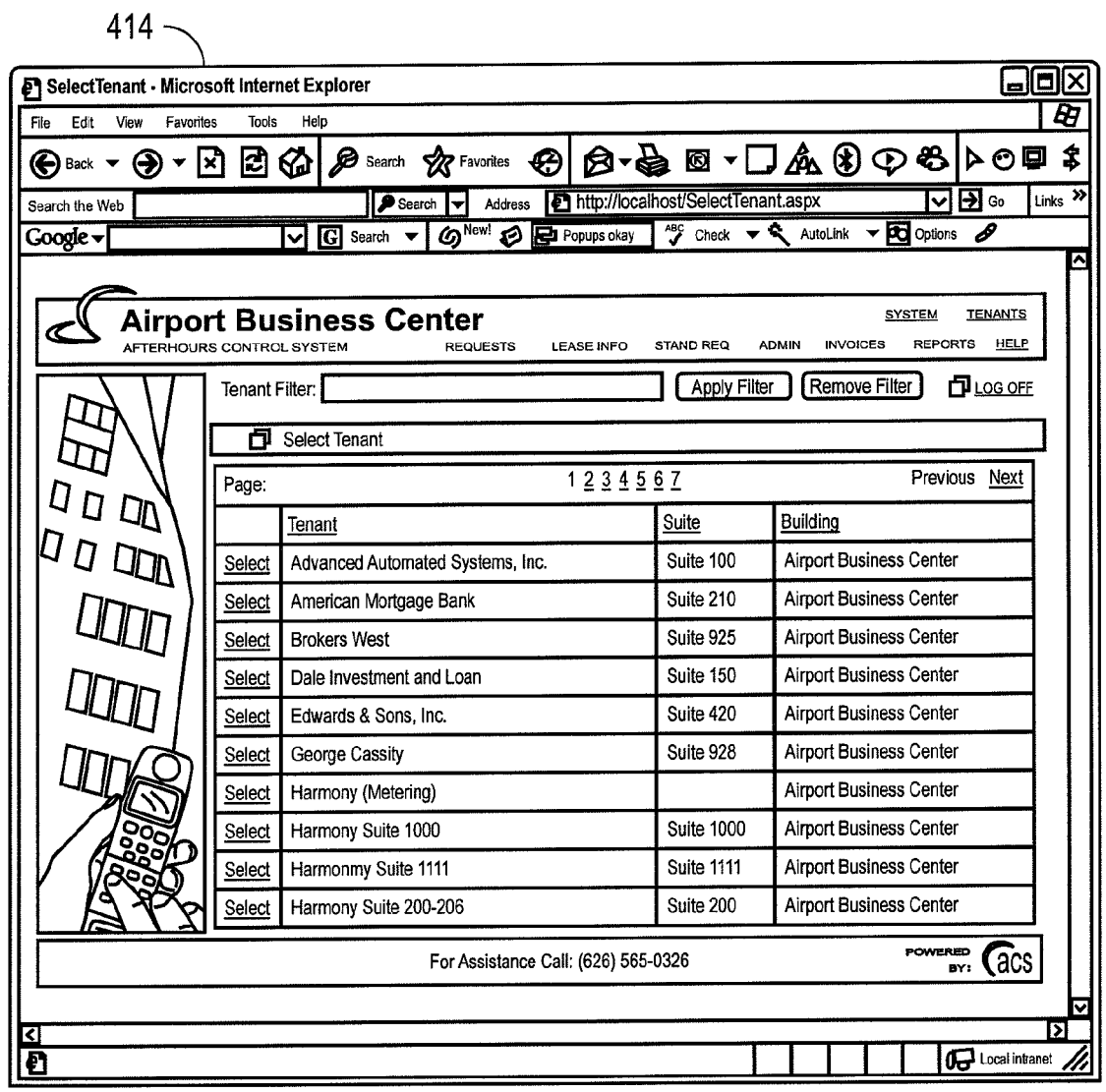

FIG. 4G shows an exemplary screenshot of a tenant master user page 414, which allows property managers access to all tenants defined on the system. Via the tenant master user page 414, property managers can schedule services, turn on/off services, edit tenant users, and set up standing requests for all tenants on the system. In some implementations for example, a user can click on a [Select] link or button associated with a tenant's name, and the system logs the user into that tenant's account as the master user. In some particular implementations, an aspect of the page associated with the tenant can be modified to indicate that the tenant is not set up properly on the server, such as if the tenant's name turns red when selected. A tenant name filter can be applied by typing in the first few letters of the tenant's name in a tenant filter field, such that when applied, only tenants that start with the specified filter criteria will be displayed in the [Select Tenant] window. To remove the filter setting, the user clicks on a [Remove Filter] button. In particular implementations, sorting among tenants can be achieved by clicking on any column header once for an ascending order, and twice for a descending order.

Figure 4H:
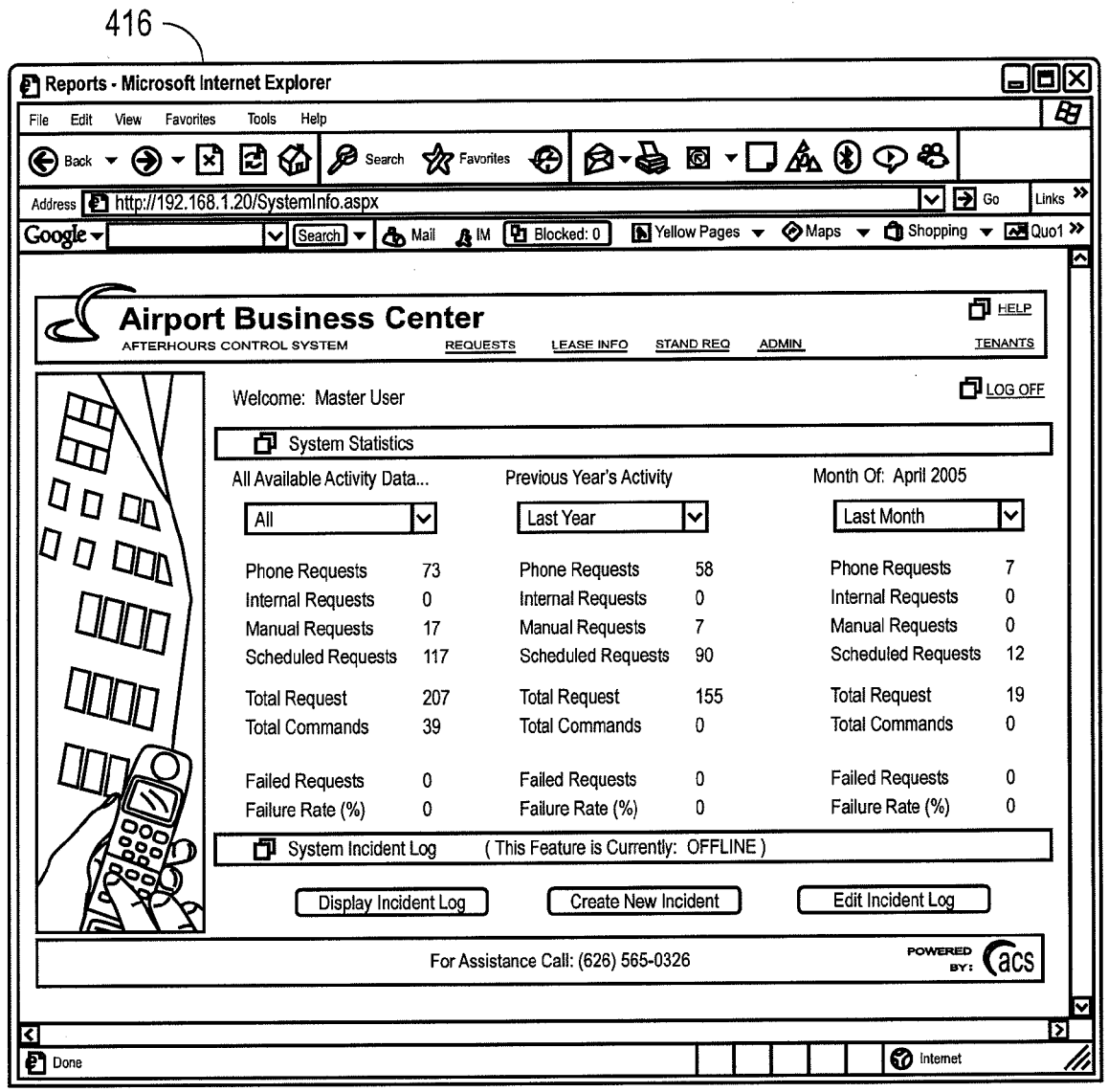

FIG. 4H shows an exemplary system page 416, which is used to track the overall system usage and performance for all buildings in a portfolio under management by the property manager or building owner. The system page includes information about numbers of requests to the system for above standard building services, and can include a number of timeframe references for comparison purposes. The request information, as well as any information provided on any page shown in FIGS. 4A-E, can be displayed in textual and/or graphical form. Further, such information can be formatted for export or transmission in any data format or according to any transmission protocol.

FIGS. 5A-C show exemplary statements having detailed billing information for building services such as energy usage, for example during weekends, after hours, or other above standard service usage.

The systems and methods described herein can produce a vast amount of data about tenant energy use or building services consumption. The data can be processed by any number of business intelligence systems, for continual improvement and optimization of building services utilization and revenue optimization. One output of such business intelligence systems is shown in FIGS. 6A-D, which illustrate several variance reports that are generated through the web approval process.

Figure 6A:
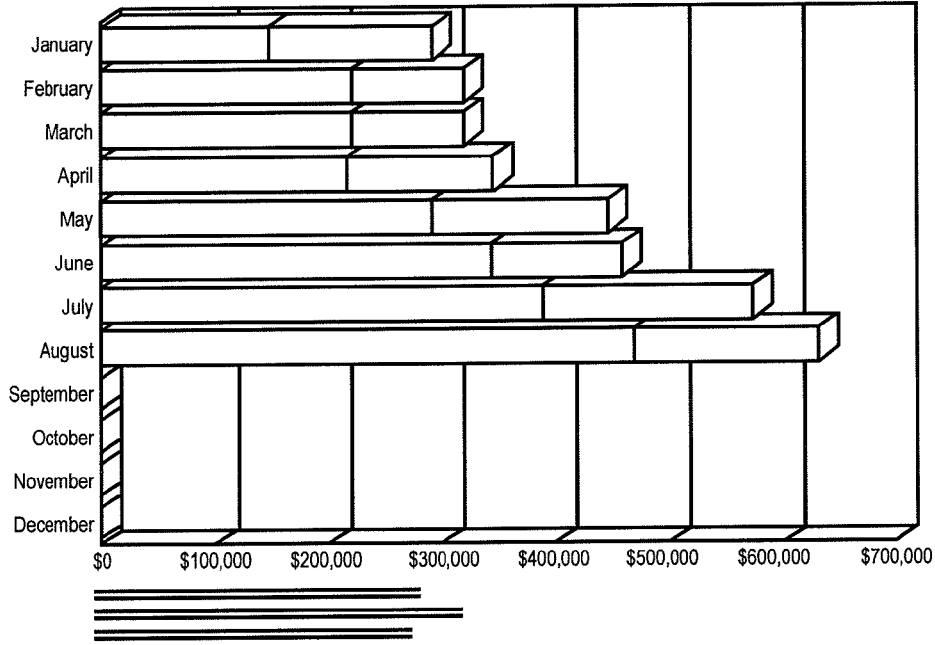
FIGS. 6A-D show exemplary variance reports generated from business intelligence on invoicing information.

FIG. 6A is an exemplary variance report, showing annual revenue variance by month, and including both a bar graph and numerical information. The dark shaded region in the bar graph represents an amount that is actually billed to the tenants, and the light shaded region represents an amount that was edited or otherwise removed from the final invoices by the property manager. This type report is shown as being processed by a portfolio, but can also be requested to be processed according to region, by company, by building type or any other grouping. FIG. 6A lists the variance according to month, but any other time frame can be shown. Further, other types of graphical depictions can be used instead of, or in conjunction with a bar graph.

Figure 6B:
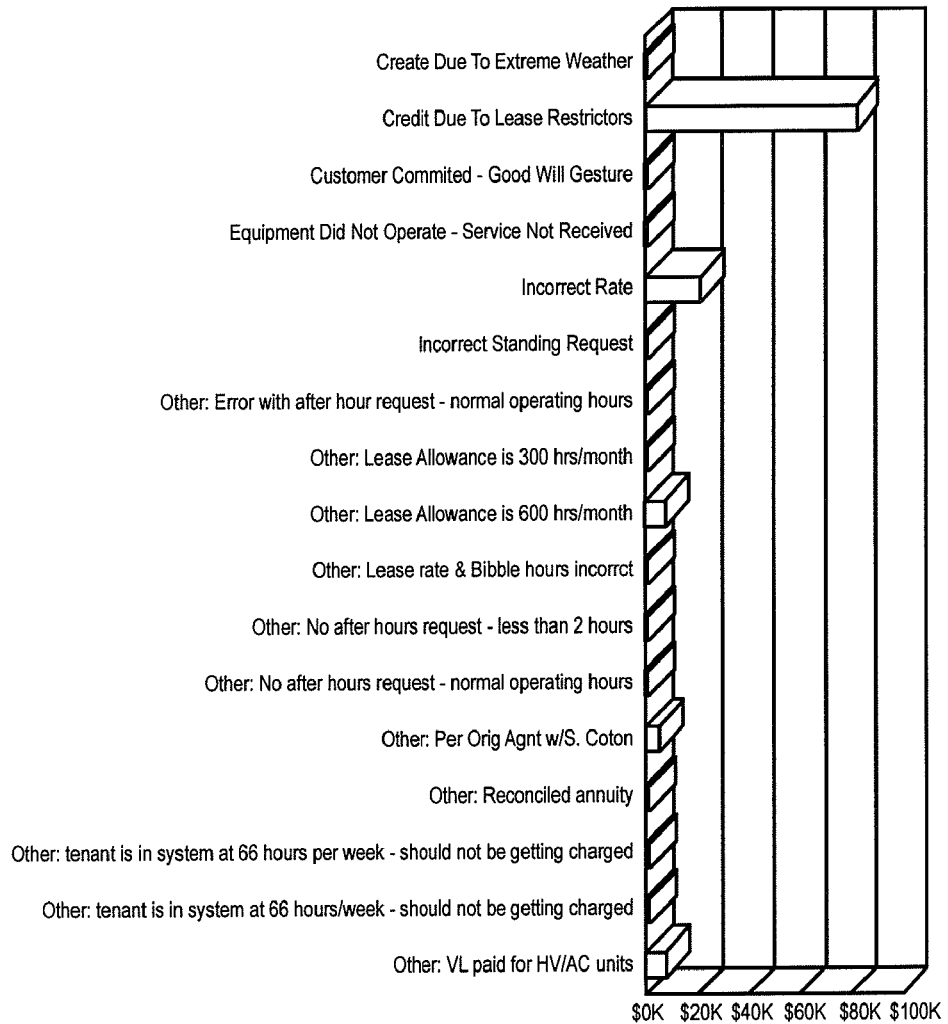

FIG. 6B is another exemplary variance report, showing above-standard services variance between used services (an amount that can be billed) and actual billed. Reductions are segregated by the cause for the variance, i.e. credit for extreme weather, credit due to lease restrictions, good will, etc. This type of report can be used to isolate and focus on problematic areas that lead to high giveaways of potential revenue for the building owner, or even to provide the tenants with information that can help them improve their consumption patterns.

Figure 6C:
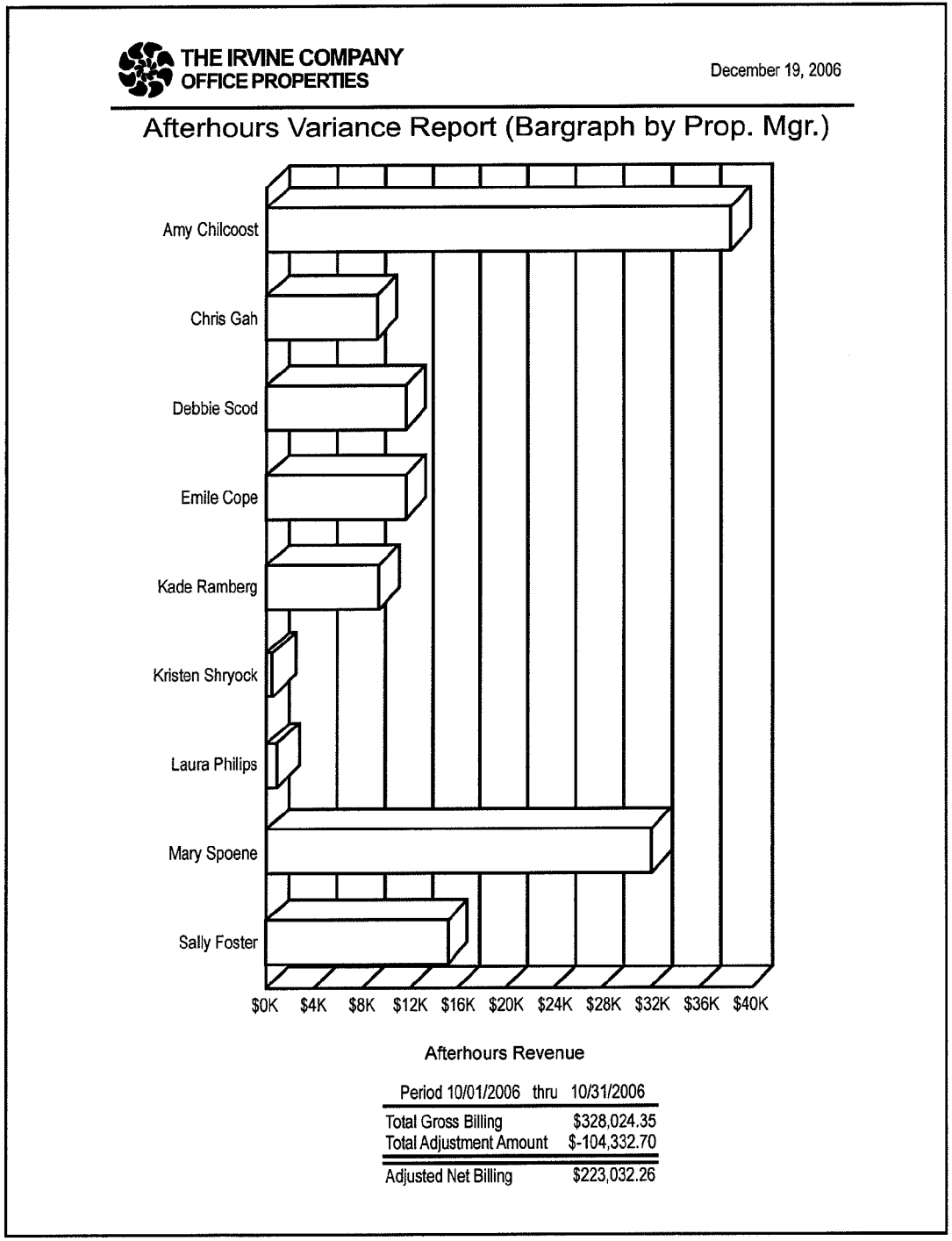
Figure 6D:
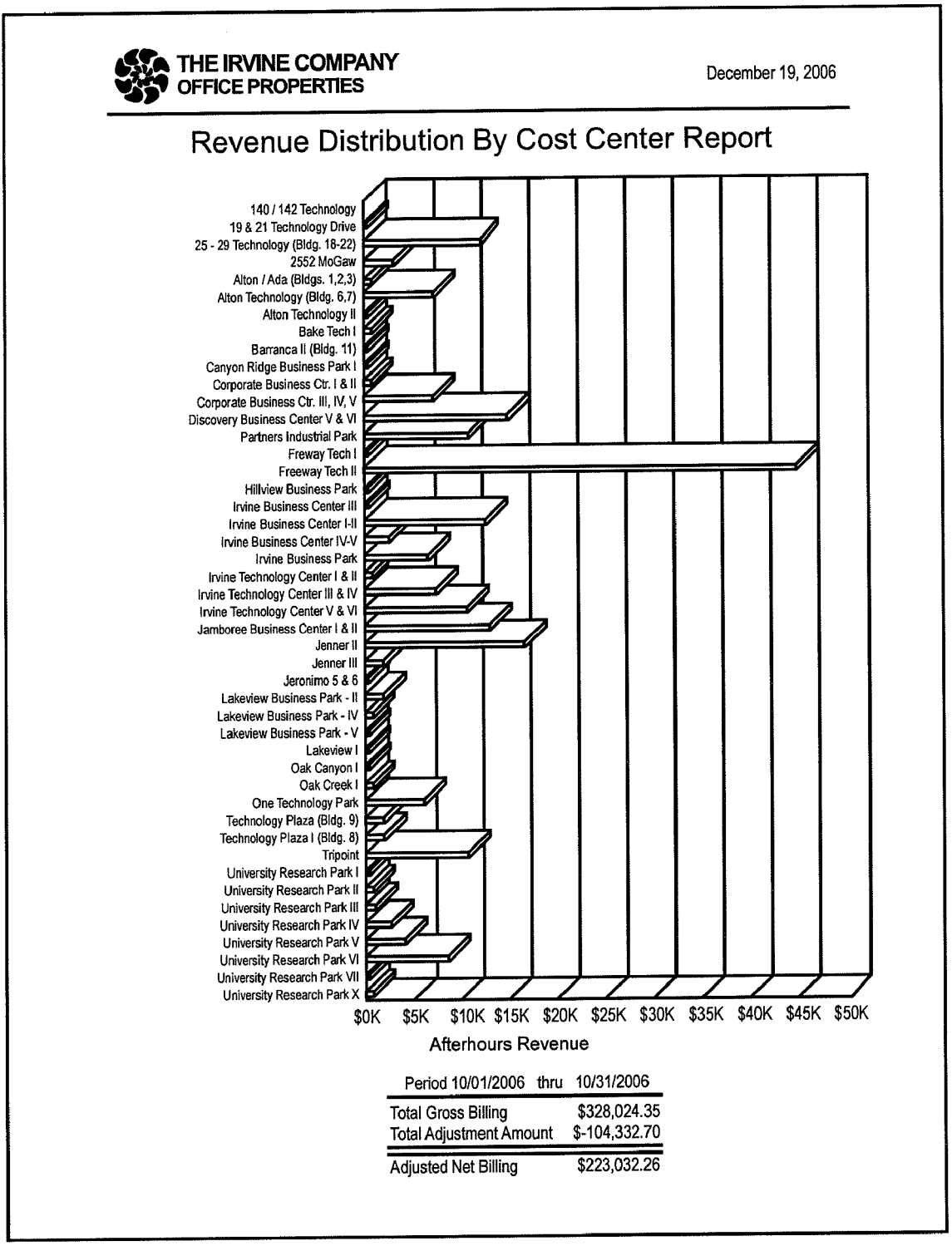

FIG. 6C is yet another exemplary variance report, showing variance between used services and billed-for services by property manager. Thus, this type of report can highlight those property managers who may have a particular problem, or who are too lenient in invoicing tenants for the services they request. FIG. 6D is another type of report, showing revenue distribution by cost center, such as a building or suite of buildings. The revenue is generated from the above standard service requests by the tenants of each particular cost center, as processed through the web approval process described above.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A building management system comprising:
   a server system configured to perform functions comprising:
   receiving at the server system, metered energy usage data for a tenant who occupies at least part of a building in accordance with a lease covering at least some metered energy usage by the tenant as part of standard tenant services, the metered energy usage data indicating that usage of metered energy in the at least part of the building comprises an instance of above standard tenant services use that is not covered by the lease;
   providing, for display at a user interface, a representation of an electronic invoice comprising a line item reflecting a cost associated with the instance of above standard tenant services use and an interactive control;
   receiving a selection entered at the user interface using the interactive control, the selection comprising an approval of or an adjustment to the line item indicating whether the cost associated with the instance of above standard tenant services use is billed to the tenant in whole, in part, or not at all; and
   generating a variance report comprising a variance between tenant-incurred costs and tenant-billed costs for above standard tenant services for the building during a time period, the tenant-incurred costs comprising the cost associated with the instance of above standard tenant services use, and the tenant-billed costs comprising an amount billed to the tenant based on the selection.

2. A building management system in accordance with claim 1, wherein the metered energy usage data are received at the server system via a communication network comprising a wireless data communication link.

3. A building management system in accordance with claim 1, wherein the metered energy usage data comprise metered energy usage data that are sent to the server system by one or more energy management systems located at the building to monitor metered energy services usage in the at least part of the building, the one or more energy management systems comprising one or more of digital sensor hardware and software and digital control hardware and software.

4. A building management system in accordance with claim 3, further comprising the one or more energy management systems located at the building, wherein the one or more energy management systems transmit the metered energy data to the server system through a first communication network.

5. A building management system in accordance with claim 1, wherein the metered energy usage data includes one or more of lighting, plugload, and HVAC use in the at least part of the building.

6. A method comprising:
   receiving, at a server system, metered energy usage data for a tenant who occupies at least part of a building in accordance with a lease covering at least some metered energy usage by the tenant as part of standard tenant services, the metered energy usage data indicating that usage of metered energy in the at least part of the building comprises an instance of above standard tenant services use that is not covered by the lease;
   providing, by the server system for display at a user interface, a representation of an electronic invoice comprising a line item reflecting a cost associated with the instance of above standard tenant services use and an interactive control;
   receiving, at the server system, a selection entered at the user interface using the interactive control, the selection comprising an approval of or an adjustment to the line item indicating whether the cost associated with the instance of above standard tenant services use is billed to the tenant in whole, in part, or not at all; and
   generating a variance report comprising a variance between tenant-incurred costs and tenant-billed costs for above standard tenant services for the building during a time period, the tenant-incurred costs comprising the cost associated with the instance of above standard tenant services use, and the tenant-billed costs comprising an amount billed to the tenant based on the selection.

7. A method in accordance with claim 6, wherein the metered energy usage data includes one or more of lighting, plugload, and HVAC use in the at least part of the building.

8. A method in accordance with claim 7, wherein the further comprising:
receiving, at the server system, a request from the tenant or an agent of the tenant for the instance of above standard tenant services use;
providing, by the server system, a confirmation message in response to the request; and
commanding, by the server system, one or more energy management systems at the building to fulfill the request, the one or more energy management systems comprising one or more of digital sensor hardware and software and digital control hardware and software that meters and controls energy usage in the at least part of the building.

9. A method in accordance with claim 6, wherein the metered energy usage data are received at the server system via a communication network comprising a wireless data communication link.

10. A method in accordance with claim 6, wherein the representation of the electronic invoice is generated using a markup language code structure.

11. A method in accordance with claim 6, wherein the representation of the electronic invoice comprises an electronic mail message that contains a hypertext transport protocol link to retrieve the representation of the electronic invoice from a storage device.

12. A method in accordance with claim 6, wherein the representation of the electronic invoice is provided over a communication network that comprises an electronic mail system.

13. A computer-implemented method comprising:
providing an electronic invoice template to a server system;
generating, using the electronic invoice template, an electronic invoice for a tenant occupying at least part of a building in accordance with a lease covering at least some energy services used by the tenant as part of standard tenant services, the electronic invoice comprising an interactive control and a line item reflecting a tenant-incurred cost associated with an instance of above standard tenant services use, the tenant-incurred cost being determined based on metered usage data for energy services used in the at least part of the building in excess of that covered by the lease; and
transmitting a representation of the electronic invoice for presentation to a property manager of the building in a user interface, the representation being transmitted through a communication network, the presentation of the electronic invoice including the interactive control providing options that allow the property manager to adjust, approve, or delete the line item.

14. A method in accordance with claim 13, wherein the electronic invoice template receives, via a user interface connected with the server system, tenant information and at least a portion of the metered usage data for energy services use in the at least part of the building.

15. A method in accordance with claim 13, wherein the metered usage data for energy services use comprises data associated with lighting, plugload, and HVAC use in the at least part of the building.

16. A method in accordance with claim 13, wherein the electronic invoice template is provided according to a markup language code structure.

17. A method in accordance with claim 13, wherein the electronic invoice is adapted to be served from the server system to a user interface according to TCP/IP.

18. A method in accordance with claim 13, wherein the representation of the electronic invoice comprises an electronic mail message containing a hypertext transport protocol link to a web page stored by the server system, the web page containing the electronic invoice.

19. A computer-implemented method comprising:
generating, for a tenant who occupies at least part of a building in accordance with a lease covering at least some metered usage of energy services by the tenant as part of standard tenant services, an electronic invoice comprising an interactive control and a line item reflecting a tenant-incurred cost associated with an instance of above standard tenant services use, the above standard tenant services comprising metered usage of energy services in the at least part of the building in excess of that covered by the lease;
posting the electronic invoice for to a web page associated with the tenant;
storing the web page associated with the tenant to a web server;
transmitting, to a user interface associated with a property manager of the building, a notification message notifying of the electronic invoice awaiting approval by the property manager, the notification message containing a web link to the web page;
receiving a request via the web link for the web page from the user interface; and
transmitting the electronic invoice to the user interface for presentation in the user interface to the property manager, the presentation of the electronic invoice including the interactive control providing options to adjust, approve, or delete the line item.

20. A computer-implemented method in accordance with claim 19, further comprising sending invoicing data to an accounting system associated with the property manager, the invoicing data comprising the cost modified according to a selection by the property manager of one of the interactive control options.

21. A computer-implemented method in accordance with claim 20, further comprising sending an activity report to a system administrator computer based on the invoicing data and the selection by the property manager of one of the interactive control options.

22. A computer-implemented method in accordance with claim 20, further comprising creating an electronic a variance report comprising a variance between tenant-incurred costs and tenant-billed costs for above standard tenant services for the building during a time period, the tenant-incurred costs comprising the tenant-incurred cost associated with the instance of above standard tenant services use, and the tenant-billed costs comprising an amount billed to the tenant based on the selection.

23. A computer-implemented method in accordance with claim 21, wherein the activity report indicates whether the tenant-incurred cost associated with the instance of above standard tenant services use is billed to the tenant in whole, in part, or not at all.

24. A computer-implemented method in accordance with claim 19, further comprising automatically generating an approval of the electronic invoice after a period of time during which no selection by the property manager of one of the interactive control options is received.

25. A computer-implemented method in accordance with claim 19, wherein the electronic invoice is generated using a markup language code structure.

26. A computer-implemented method in accordance with claim 19, further comprising creating an electronic report indicating a recovery of the tenant-incurred cost associated with the instance of above standard tenant services use and of other costs associated with other tenant-incurred costs during a time period.

27. A building management system in accordance with claim 26, wherein the server system transmits the variance report to a recipient.

* * * * *